W. J. OLIVER.
CAR STEP.
APPLICATION FILED SEPT. 13, 1911.
1,021,625.
Patented Mar. 26, 1912.
3 SHEETS—SHEET 1.
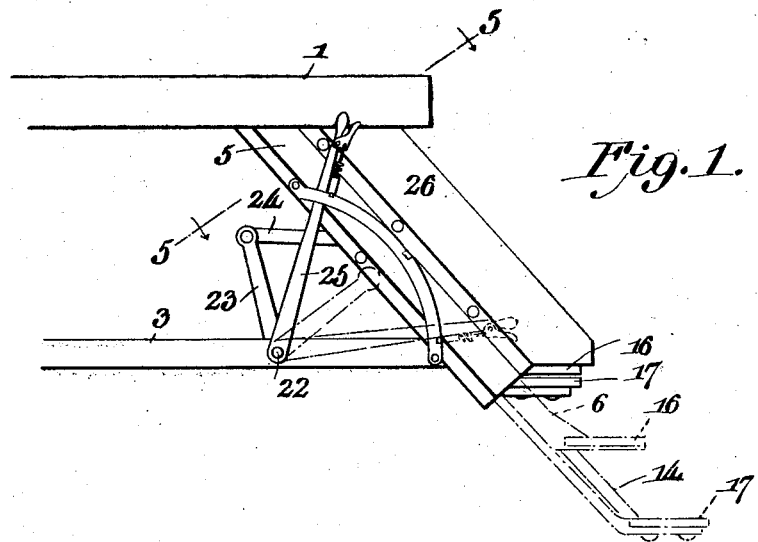
Fig. 1.
Fig. 3.
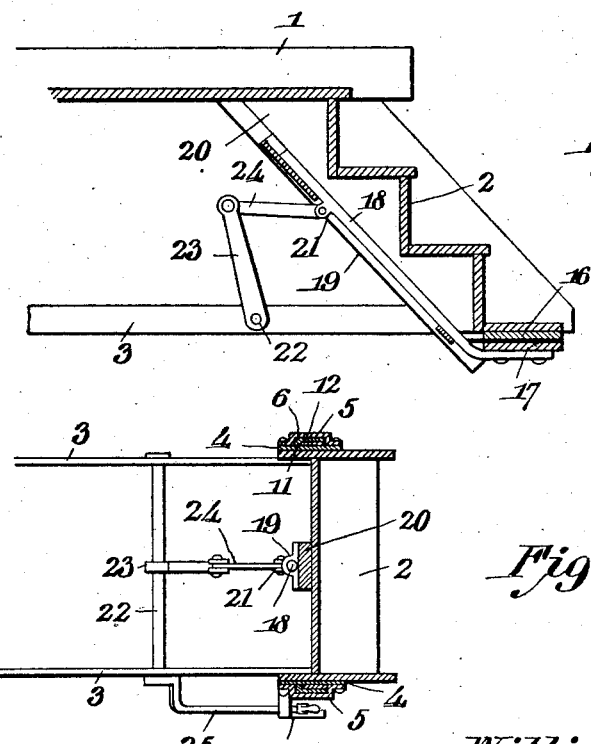
Fig. 5.
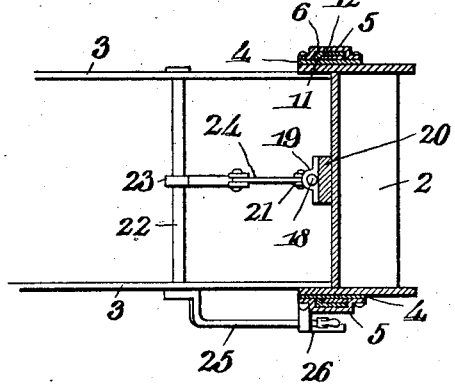
Witnesses
G. B. Galt.
E. Edmonston
Inventor
William J. Oliver:
By Victor J. Evans
Attorney W. J. OLIVER.
CAR STEP.
APPLICATION FILED SEPT. 13, 1911.
1,021,625.
Patented Mar. 26, 1912.
3 SHEETS—SHEET 2.
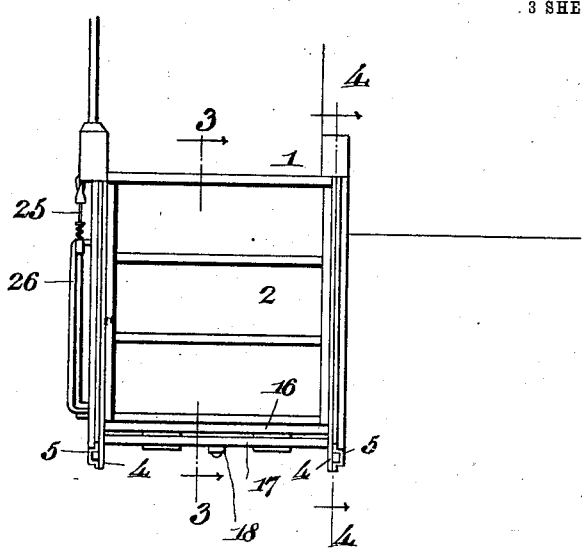
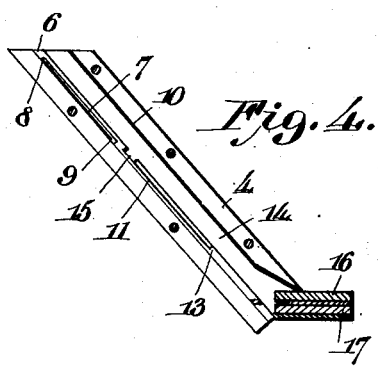
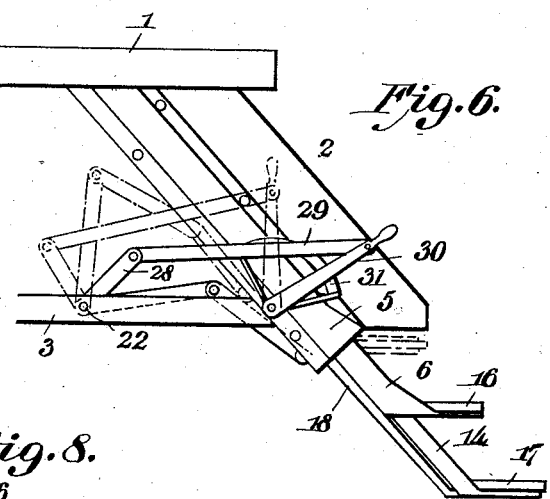
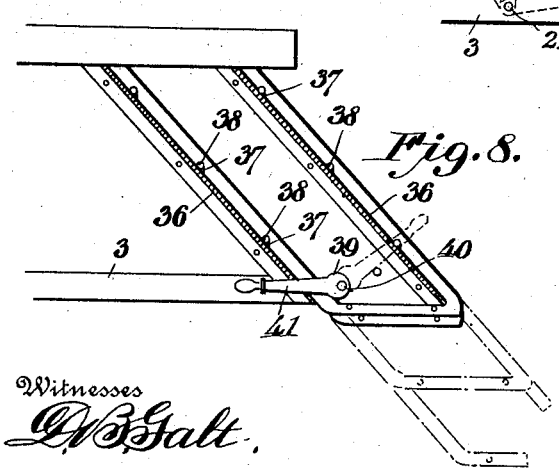
Witnesses
D. B. Galt.
E. Edwouston Jr.
Inventor
William J. Oliver.
By Victor J. Evans
Attorney W. J. OLIVER.
CAR STEP.
APPLICATION FILED SEPT. 13, 1911.
1,021,625.
Patented Mar. 26, 1912.
3 SHEETS—SHEET 3.
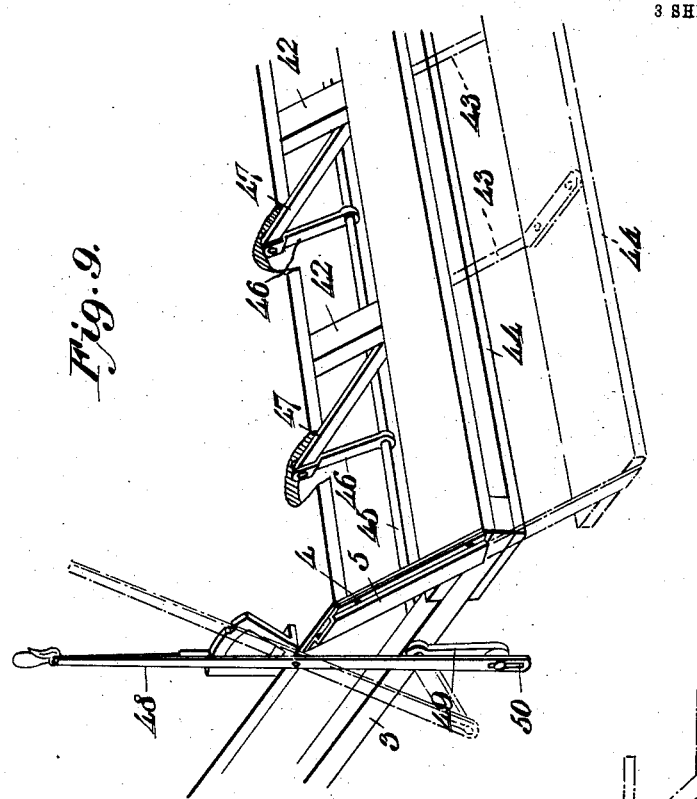
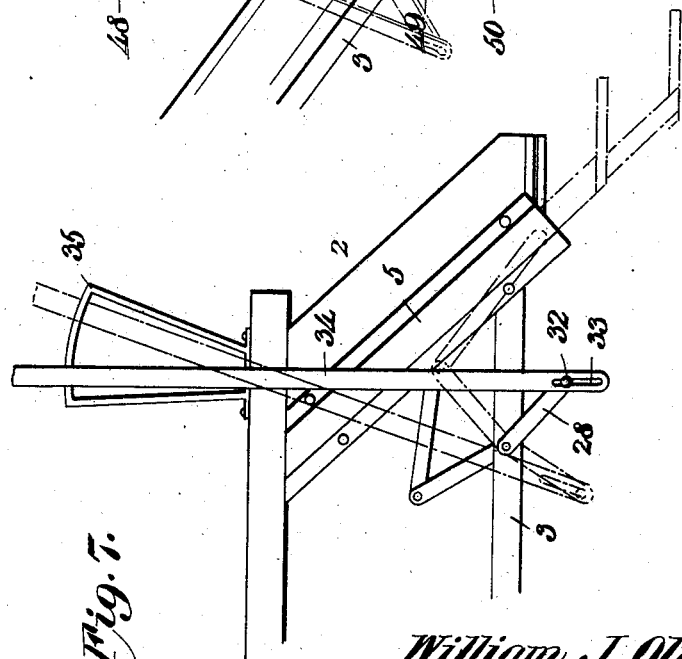
Witnesses
Inventor
William J. Oliver.
By Victor J. Evans
Attorney

UNITED STATES PATENT OFFICE.

WILLIAM J. OLIVER, OF ERLANGER, KENTUCKY.

CAR-STEP.

1,021,625.  Specification of Letters Patent.  Patented Mar. 26, 1912.

Application filed September 13, 1911. Serial No. 649,014.

*To all whom it may concern:*

Be it known that I, WILLIAM J. OLIVER, a citizen of the United States, residing at Erlanger, in the county of Kenton and State of Kentucky, have invented new and useful Improvements in Car-Steps, of which the following is a specification.

This invention relates to steps and more particularly to car steps.

The object of the invention is to provide simple and efficient means for extending the steps so that passengers may readily get to the platform of the car and alight from the same without having to step so high. With the present type of day and Pullman coaches, it is necessary for the porter to place an additional step or stool upon the platform for the passengers to step on in alighting from the car and in traction cars for street railways service the steps have to be made comparatively high and well within the bounds of the car itself to prevent interference with traffic.

It is the object of this invention to provide a simple device by which these difficulties may be overcome and also a device which may be operated to extend the steps to accommodate the same to different levels of platforms, the degree of this adjustment being controlled only by the limit of necessity.

A further object of the invention is the provision of an expansible step mechanism having means for controlling the degree of extension and at the same time providing a rigid support for each step when extended by limiting the movement of the upper extensible step and then limiting the movement of the lower steps upon the succeeding upper one, so that when a great number of steps are extended a series of limiting stops is provided, one upon each step supporting member, thereby permitting the extension of one or more of the steps and providing a secure stop for each.

Further objects of the invention will appear as the following specific description is read in connection with the accompanying drawings, which form a part of this application, and in which:—

Figure 1 is a side elevation showing the steps in extended position in dotted lines. Fig. 2 is a vertical front elevation. Fig. 3 is a vertical sectional view on the line 3—3 of Fig. 2. Fig. 4 is a similar view on the line 4—4 of Fig. 2. Fig. 5 is a sectional view on the line 5—5 of Fig. 1. Fig. 6 is a side elevation of a modified form. Fig. 7 is a side elevation of a further modified form. Fig. 8 is a side elevation, with parts broken away, of a further modification. Fig. 9 is a diagrammatic perspective view showing the application of the device to an ordinary summer car.

Referring more particularly to the drawings, 1 represents a platform of an ordinary day coach which has the steps 2 extending from opposite sides thereof. These steps are connected together adjacent their lower portion by brace rods 3 and have secured to their strings and inclined therewith the bearing plates 4 to which are attached the channel lines 5. Slidably mounted in each channel line and working over the plates 4 are bars 6 which are notched, as shown at 7, throughout a portion of their length so as to provide limiting shoulders 8 for engagement with the stop 9 which is passed through a channel line and through a wear plate. The bars 6 are turned inwardly, as shown at 10 and 11, on their inner sides so as to form a channel 21 and a limiting shoulder 13, and slidably mounted in each channel is a bar 14 having a projection 15 formed thereon to engage the shoulder 13. The bars 6 and 14 are turned inwardly at their ends so as to support the extension treads 16 and 17, the latter having connected to it an operating rod 18 which slides in a channel member 19, preferably secured to a false string 20 arranged intermediate the width of the steps. This channel member 19 is slotted so as to permit the projection of a pivoting lug 21 carried by the rod 18.

Journaled in the brace bars 3 is a crank shaft 22 to which a crank 23 is secured, this crank being connected by means of a link 24 to the pivoting lug 21. The outer end of the crank shaft 22 has secured thereto a lever 25 which operates within a notched segment 26 secured to one of the strings and adapted to hold the lever in adjusted position, thereby limiting the movement of the lower extension tread, as will be hereinafter pointed out.

In the normal position of the extension treads 16 and 17 they are collapsed beneath the lower tread of the steps 2 and if the level of the platform upon which landing is made is sufficiently high to only require the extension of one step the lever 25 is moved downwardly to the intermediate notch on the segment 26. This will force the lower tread 17 to its intermediate position, the upper tread 16 following therewith by gravity until a shoulder 8 comes into contact with the stop 9. In this position the tread 17 is folded beneath the tread 16, as is usual. A further downward movement of the lever forces the tread 17 outwardly until the lever comes into contact with the end of the segment which limits its downward movement and also the outward movement of the tread 17. In this position the steps are extended to their fullest open position, the tread 16 being limited by the stop 9 and the tread 17 being limited by the engagement of the projection 15 with the stop 13 upon the bars 6.

In the modification shown in Fig. 6, the crank shaft 22 has secured thereto a crank 28 which is connected by means of a link 29 to the operating lever 30 pivoted upon the string 4. This operating lever operates over the notched segment 31, as is usual, and when thrown to extension the steps pull upon the link 29 which through the crank 28 and the shaft 22 actuates the crank 23 and through the link 24 the projecting rod 18. By this means a short lever can be used and friction leverage obtained to raise the steps. In this form, as in Fig. 5, the treads 16 and 17 are limited in the same manner in the outward movement.

In the modified form shown in Fig. 7, the crank 28 extends downwardly and is provided with a pivot stud 32 which engages a slot 33 in the lower end of an operating lever 34 pivoted to the platform and operating over the segment 35 in position to be manipulated by the motorman or conductor.

In the modification shown in Fig. 8, the side bars of the extension steps are mounted in ways 36 which are somewhat wider than the side bars so as to permit lateral movement therein and the bars are provided with notches 37 which engage pins 38 projecting outwardly from the strings of the steps. The bars of the upper extension tread 16 are formed in a similar manner to that described in Figs. 1 to 5 and the bars of the extension tread 17 are slidably mounted therein and are limited in a manner similar to that before described. In order to prevent the outer bars shaking out of engagement with the pins 38, small eccentrics 39 are secured upon the transverse shaft 40 and are adapted to engage the bars through the ways to hold them in position, a weighted lever 41 being attached to the shaft to hold the eccentrics in operative position.

In the form shown in Fig. 9, the platform has extending diagonally therefrom a plurality of guideways 42 in which supporting bars 43, similar to 18, are slidably mounted. These ways are connected preferably to the ordinary side step of the traction car and the extension step 44 which is attached to the projecting bars 43 folds beneath this step as does the extension tread 16. All of the projecting bars are operated through a shaft 45 and the cranks 46 and links 47 which are connected to the projecting bars. The shaft 45 is rotated in either direction by a lever 48 which connects with the shaft and the projecting bars through the crank 49 which is connected to the slotted end 50 of the lever 48, as was described for the structure shown in Fig. 7. In this manner the step 44, which extends the entire length of the car and is parallel on the ordinary step, may be readily raised and lowered so that passengers will not have to make such a high step in getting on the car or alighting therefrom and so that the step will be out of the way and will thereby be out of the way of street traffic.

Having thus described the invention, what I claim as new is:—

1. In combination, a flight of steps, guide members secured to and inclined with the strings thereof, supporting members slidably mounted in the guide members, means to limit the movement of the supporting members, an extension tread carried by said supporting members, secondary supporting members slidably mounted in the first supporting members, coacting means on the first and secondary supporting members, a tread carried by said secondary supporting members, and means for raising and lowering said treads.

2. In combination, a flight of stairs, guiding members secured to and inclined with the strings thereof, channel supporting members slidably mounted in said guide members and having notches therein, means to engage the notches and to limit the movement of said supporting members, supporting bars slidably mounted in the channel supporting members, coacting means on the bars and supporting members for limiting the movement of the bars, treads carried by the supporting members and bars, a projecting member connected to one of the treads, means for slidably supporting the projecting member, and lever operated mechanism for raising and lowering said projecting member.

3. In combination, a flight of stairs, guiding members secured to and inclined with the strings thereof, channel supporting members slidably mounted in said guide members and having notches therein, means to engage the notches and to limit the movement of said supporting members, supporting bars slidably mounted in the channel supporting members, coacting means on the bars and supporting members for limiting the movement of the bars, treads carried by the supporting members and bars, a projecting member connected to one of the treads, means for slidably supporting the projecting member, a crank shaft connected to said projecting member, a segment, and a lever operating over the segment for rotating the crank shaft in either direction for raising and lowering said treads.

In testimony whereof I affix my signature in presence of two witnesses.

WILLIAM J. OLIVER.

Witnesses:
H. S. DIXON,
WILBUR KELLY.

Copies of this patent may be obtained for five cents each, by addressing the "Commissioner of Patents, Washington, D. C."